C. E. MASON.
Watch Pallet.

No. 77,827.

Patented May 12, 1868.

Witnesses
Thos Tusche
W. Trewin

Inventor
C E Mason
Per Munn & Co
Attorneys

United States Patent Office.

CHARLES E. MASON, OF ELGIN, ILLINOIS.

Letters Patent No. 77,827, dated May 12, 1868.

IMPROVEMENT IN PALLETS FOR TIME-PIECES.

*The Schedule referred to in these Letters Patent and making part of the same.*

TO ALL WHOM IT MAY CONCERN:

Be it known that I, CHARLES E. MASON, of Elgin, in the county of Kane, and State of Illinois, have invented a new and useful Improvement in Pallet for Watches, &c.; and I do hereby declare that the following is a full, clear, and exact description thereof, which will enable others skilled in the art to make and use the same, reference being had to the accompanying drawings, forming part of this specification.

The present invention relates to a novel manner of inserting the jewels or pallets in the block or stud provided for them, which consists in slitting the block or stud for the reception of the jewels or pallets, by cutting the block through from side to side, with the bottom of the cut parallel to the top, whereby cheapness is obtained, and greater facility of adjusting the pallets or jewels to their proper position, for insuring perfect action on the scape-wheel, the jewels being pushed forward or backward in the slot in lieu of grinding and polishing them, as heretofore.

In the accompanying plate of drawings my improvement in pallet for watches, &c., is illustrated—

Figure 1:
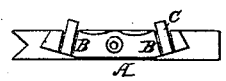

Figure 1 being a view of the under side of the pallet-block or stud, and

Figure 2:
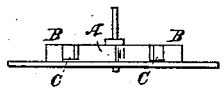

Figure 2 an edge view of the same.

Similar letters of reference indicate corresponding parts.

A, in the drawings, represents the pallet-block or stud, which, from side to side, is slit at two points, B, to receive the jewels or pallets C, which slits are extended and cut from one side to the other, whereby the advantages hereinbefore recited are obtained.

I claim as new, and desire to secure by Letters Patent—

The pallet-block or stud, when slit or cut across from side to side, substantially as described, for the purposes specified.

The above specification of my invention signed by me, this seventh day of October, 1867.

CHAS. E. MASON.

Witnesses:
A. BARTO,
R. SMITH.